Nov. 25, 1952 — A. G. TEASON — 2,619,240
AUTOMOBILE PARKING AND STORAGE MECHANISM
Filed Sept. 17, 1947 — 2 SHEETS—SHEET 1

INVENTOR
Adam G. Teason
By Fishburn & Mullendore
ATTORNEYS

Nov. 25, 1952          A. G. TEASON          2,619,240
AUTOMOBILE PARKING AND STORAGE MECHANISM
Filed Sept. 17, 1947          2 SHEETS—SHEET 2
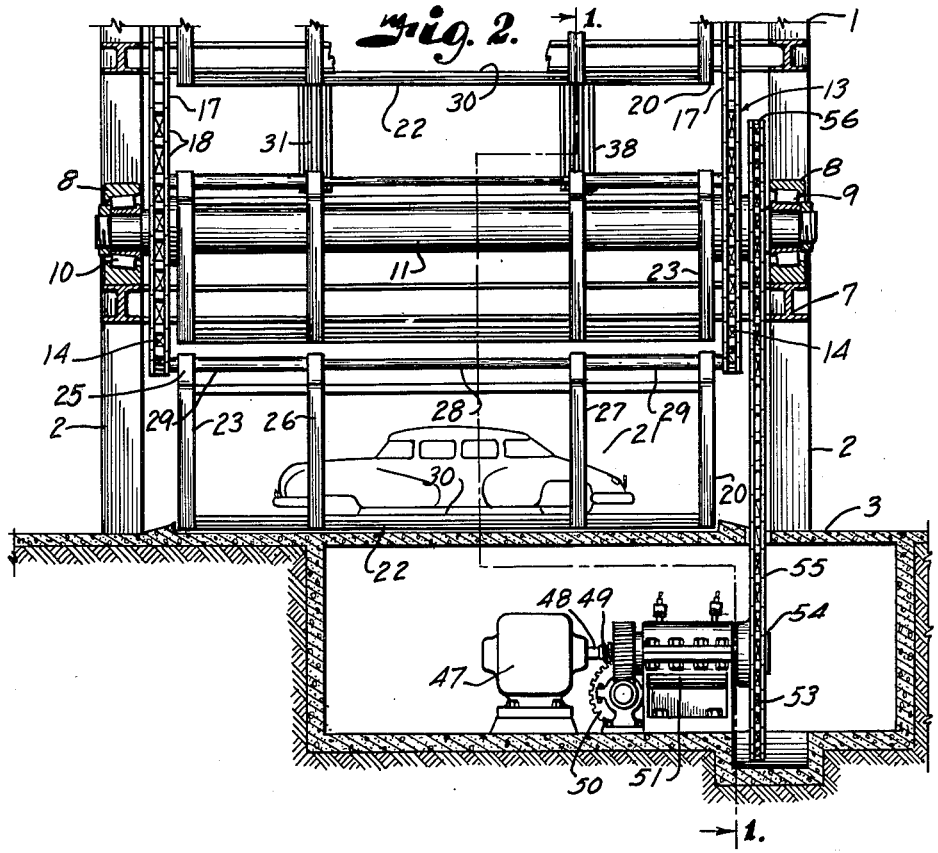
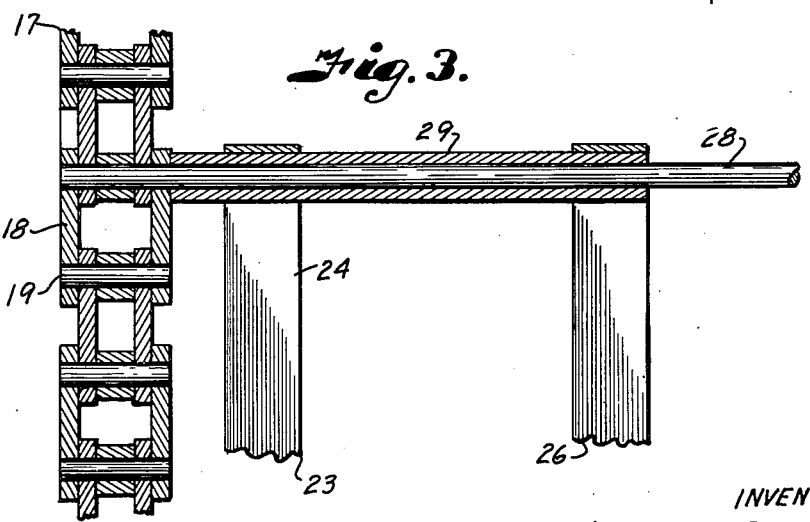
INVENTOR
Adam G. Teason
By Fishburn Mullendore
ATTORNEYS Patented Nov. 25, 1952

2,619,240

UNITED STATES PATENT OFFICE 2,619,240

AUTOMOBILE PARKING AND STORAGE MECHANISM

Adam G. Teason, Kansas City, Mo.

Application September 17, 1947, Serial No. 774,485

1 Claim. (Cl. 214—16.1)

This invention relates to automobile parking and storage mechanism and has particular reference to conveyors or elevators having a plurality of movable platforms or cages on which the automobile or other vehicle may be parked or stored, said platforms being arranged in a vertical position one to the other.

The principal object of the present invention is to provide an elevator or storage mechanism for automobiles adapted to conserve floor space in a building or parking place.

Other objects of the invention are to provide a system for parking and storing vehicles without congestion; to provide an endless chain or cable mechanism for supporting cages or platforms mounted pivotally thereon and moving the vehicle from one column to another in an upright position; to provide a framework structure for mounting the endless chain conveyor mechanism; to provide means on such framework structure for maintaining the cages in vertical position; to provide means for lowering a cage to the surface of the floor of the building or parking place so that the vehicle may be driven directly onto the cages or platforms; to provide means for moving the cages from one column to the other in a parking structure; to provide driving means in the structure so as to move the conveyor in clockwise or counterclockwise direction; and to provide a device of this structure simple, economical to manufacture and efficient in operation.

In accomplishing these and other objects of the invention, I have provided improved details of structure, the preferred form of which is illustrated in the accompanying drawings wherein:

Fig. 2 is a side elevation sectional view through the lower part of the device, portions being broken away, particularly illustrating the mechanism for rotating the conveyor.

Fig. 3 is a sectional view particularly illustrating the mounting of the cages on the endless chain conveyor.

Figure 1:
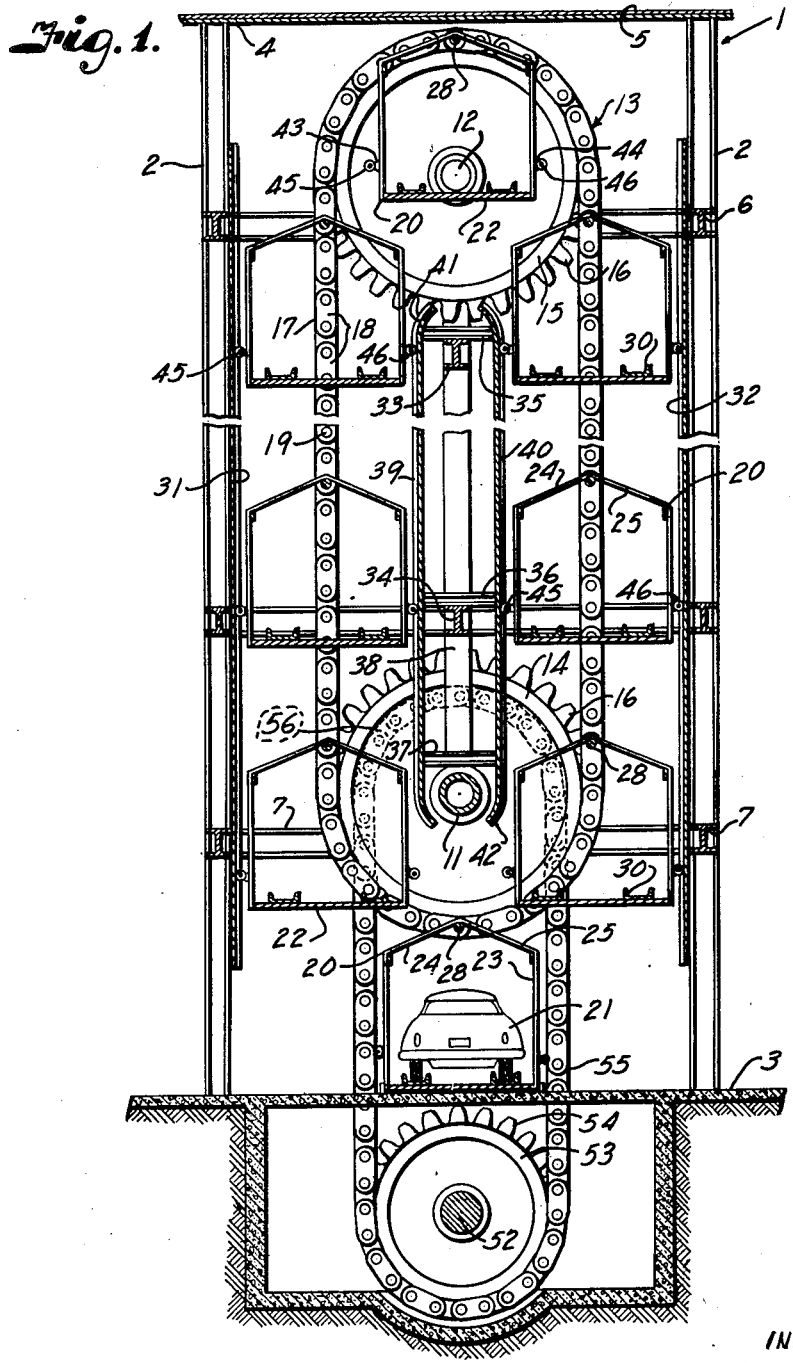
Fig. 1 is a vertical sectional view of my invention on the line 1—1, of Fig. 2, showing a vehicle on the cage in loading position.

Referring more in detail to the drawings:

1 designates a parking and storage device embodying the features of my invention comprising a framework structure having posts or uprights 2 at the respective corners of the framework structure mounted upon a suitable base, such as the concrete floor 3 of the building or other parking space. While I preferably construct the framework structure of steel beams or the like, other suitable material may be used. The framework structure is of a width to accommodate two rows of automobiles with space between for the conveyor mechanism as will later be described, and slightly longer than the vehicle to be stored. The framework structure is provided with suitable connections at the top as indicated at 4, Fig. 1, on which may be mounted a roof 5 if desired. To provide a sturdy framework the respective uprights 2 are connected by suitable beams, for example; an I beam 6 is arranged horizontally between the uprights adjacent the upper portion of the structure and I beam 7 is arranged horizontally adjacent the lower portion of the structure. Other upright, horizontal and angular members may be used on the respective side of the framework structure and secured thereto to form a suitable rigid and strong structure for the framework for the particular installation.

Substantially midway between the corner posts at the end of the framework structure and supported on the I beams 7 are bearing housings 8 in which are supported suitable bearings 9 and 10 notably mounting a lower shaft 11 for the conveyor structure. Suitable bearings (not shown) are supported on the I beams 6 for notably mounting stub shafts 12 near the top of the framework structure for supporting the upper ends of the conveyor mechanism 13.

Mounted upon the respective ends of the shaft 11 are sprocket wheels 14 and mounted on the shafts 12 in vertical alignment with the sprocket wheels 14 are sprocket wheels 15. The sprocket wheels 14 and 15 are provided with the usual sprocket teeth 16 over which an endless chain 17 engages at the respective ends of the framework structure. The chain 17 is composed of links 18 assembled with the usual pins 19 and at spaced intervals said chains pivotally mount cages 20 for supporting an automobile as indicated at 21.

The cages consist of a bottom 22, upright corner members 23 having inwardly and upwardly sloping upper portions 24 and 25 extending transversely of the cage in spaced relation to the bottom for forming end supports for said cage. Said cage also is preferably provided with intermediate uprights 26 and 27, having portions extending over the top of the cage for preventing the car from being displaced sideways from the cage.

In order to pivotally mount the cage on the endless chain, I provide a shaft 28 extending longitudinally of the cage 20 and carried in tubular members 29 secured to the center of the upper portions of the uprights 23, 25 and 26. The ends of the shaft extend outwardly from the tubular member 29 and serves as a pin connecting two of the links 18 as best illustrated in Fig. 3. The bottom 22 of the cage is provided with trackways 30 for aiding in centering the automobile on said cage and said trackways may be provided with suitable stops, if desired, to prevent rolling of the automobile in the cage after it is parked therein.

In order to prevent sideways tipping or movement of the cages as they are ascending or descending on the conveyor, I preferably provide substantially channel shaped members 31 and 32 arranged vertically on the respective sides of the framework structure and with the legs of said channels directed inwardly. I preferably provide two of the channel members on each side; however, any number may be used. And on the inside of the framework structure mounted on horizontal I beams 33 and 34 I provide transverse arms 35 and 36 and arms 37 on the lower end of vertical hangers 38 in the center of the framework structure for supporting two inner track members 39 and 40. The members 39 and 40 are straight except the upper and lower ends which are curved inwardly as indicated at 41 and 42, so as to prevent interference with the cages as they are being raised or lowered from the conveyor.

Mounted on the respective sides of the cages 20 by ears or the like 43 and 44 are rollers 45 and 46 so spaced that they will engage in trackways provided by the vertical substantially channel shaped members 31, 39, 32, and 40 respectively.

In order to rotate the conveyor mechanism to raise and lower the cages in the respective columns of the framework structure, I preferably provide a motor 47 located below a floor 3 of the building structure or parking space as illustrated in Fig. 2. The shaft 48 of the motor carries a worm gear 49 meshing with a gear 50 of a speed-reducer mechanism 51 having a shaft 52 upon which is mounted a sprocket 53 have sprocket teeth 54 engaging an endless chain 55 running over a sprocket 56 mounted upon the shaft 11 of the framework structure, as illustrated in Fig. 2.

Operation of the device constructed and assembled as described is as follows: With a cage in the lowermost position with the bottom in contact with the floor 3 of the building structure as illustrated in Fig. 1, the automobile may be driven directly onto the cage or platform by the attendant or by the owner. The motor 47 is then operated through a suitable control means (not shown) to operate the speed-reducer 51 and rotate the sprockets 53 and 56 driving the lower shaft 11 of the framework structure which, in turn, will rotate the conveyor structure comprising the endless chains 17 running over the sprockets 14 and 15 respectively to move the cage carrying the automobile in a clockwise direction to enter the left-hand column of the framework structure moving the cage upwardly. The rollers 45 on the outer side of the cages will engage in the trackways 31 and the inner rollers 45 will engage in the inner trackways 39 to prevent tipping of the cage, as it moves upwardly in the column. When the cage reaches the sprocket 15, it will ride in a clockwise direction to the uppermost position as shown in Fig. 1 and then starts downwardly with the rollers disengaging from the respective trackways 31 and 39. Upon descent of the cage the rollers will engage in the trackways 32 and 40 respectively so as to hold the cage in vertical position on downward movement in the right-hand column of the framework structure.

It will be obvious that the cages may be stopped at any position in the structure or it may be reversed in anti-clockwise direction if desired.

When the owner calls for his car, the attendant, by operating the motor, will lower the cage to the bottom position as shown in Fig. 1 and the car may be driven forwardly from the structure.

It will thus be obvious that an entrance may be provided to the parking space and an outlet so that the cars may be driven in forwardly and then on out forwardly requiring very little space for such operation.

The framework structure of my invention may be of any desired height to support any desired number of cages on the conveyor structure. If desired, two or more structures thus far described may be placed in end-to-end position to conserve space and, by keeping the lower cage open, the cars may be driven through from one structure to another.

It will also be obvious that the structures may be placed side by side and operated by forces of power independently of each other and as many columns may be provided as desired still requiring only one entranceway and one outlet.

While I preferably construct my device of steel or similar material, it will be obvious that part of the framework structure may be composed of wood or other suitable material.

It will be obvious from the foregoing that I have provided an improved parking structure for parking vehicles on a conveyor system requiring a minimum amount of floor space for operation.

It will further be obvious that cables or other suitable means may be substituted for the link chain construction without departing from the spirit of my invention, by substitution of pulleys for the sprocket wheel.

What I claim and desire to secure by Letters Patent is:

An automobile parking device comprising, a framework structure forming spaced vertical columns interconnected at their ends, a floor at the lower connected ends, coaxial shafts rotatably supported on the framework structure at the upper and lower connected ends, the axis of said shafts being equally spaced and intermediate of the vertical centers of the columns, the lower shaft being located above said floor, sprockets on the respective ends of said upper and lower coaxial shafts, a shaft below said floor parallel to and in vertical alignment with said coaxial shafts, means rotatably supporting said shaft below said floor, the lower sprockets fixed to the lower shaft being in vertical alignment with the respective upper sprockets, said upper and lower sprockets having a fixed diameter substantially equal to the spacing of the vertical centers of the columns, endless chains having pivotally connected links operating over the respective aligned upper and lower sprockets, each chain having a path of movement in a vertical plane defined by the respective upper and lower sprockets, said chains travelling in opposite directions in the columns and in curved paths at the interconnected ends, a plurality of horizontal shafts extending between the respective chains and having their ends pivotally connecting certain links in corresponding portions of the respective chains, cages having floors and open at the ends for carrying automobiles pivotally suspended from the horizontal shafts between the chains, said cage floor substantially resting on the floor at the lower connected end of the columns at the lowest point of travel in the lower curved path of movement of the chains, a driven sprocket fixed to the lower shaft in spaced relation to the ends of the cages, a drive sprocket on the shaft below the floor at the lower connected ends of the columns and in vertical alignment with the driven sprocket, said driving and driven sprockets having a fixed diameter greater than the width of the cages, drive means for rotating the driving sprocket to drive the lower shaft and effect simultaneous movement of the chains for raising and lowering the cages, U-shaped channel members forming guides on the framework in each of the columns, and rollers on the cages engaging in the channels for stabilizing the cages during travel in the columns.

ADAM G. TEASON.

REFERENCES CITED

The following references are of record in the file of this patent:

UNITED STATES PATENTS

| Number | Name | Date |
|---|---|---|
| 1,826,357 | Makutchan | Oct. 6, 1931 |
| 1,873,391 | Haish et al. | Aug. 23, 1932 |
| 1,887,245 | Murray | Nov. 8, 1932 |
| 2,069,986 | Joslin | Feb. 9, 1937 |
| 2,078,770 | Morton | Apr. 27, 1937 |
| 2,446,344 | Smith | Aug. 3, 1948 |

FOREIGN PATENTS

| Number | Country | Date |
|---|---|---|
| 353,900 | Great Britain | July 27, 1931 |